United States Patent [19]
Wojdyla

[11] 3,994,542
[45] Nov. 30, 1976

[54] SINGLE PIECE BEARING
[75] Inventor: Gary A. Wojdyla, Ithaca, N.Y.
[73] Assignee: NCR Corporation, Dayton, Ohio
[22] Filed: Sept. 4, 1975
[21] Appl. No.: 610,485

[52] U.S. Cl. .................................. 308/22; 308/26
[51] Int. Cl.² ...................................... F16C 13/04
[58] Field of Search ...................... 308/15, 22, 26

[56] References Cited
UNITED STATES PATENTS

| | | | |
|---|---|---|---|
| 3,033,624 | 5/1962 | Biesecker | 308/15 X |
| 3,193,335 | 7/1965 | Wing | 308/22 |
| 3,353,879 | 11/1967 | Jorn | 308/26 |
| 3,372,960 | 3/1968 | Fisher | 308/22 X |

Primary Examiner—Philip Goodman
Assistant Examiner—Gene A. Church
Attorney, Agent, or Firm—J. T. Cavender; Wilbert Hawk, Jr.; George J. Muckenthaler

[57] ABSTRACT

A frame member carries a single piece which provides the several functions of locating, retaining, and bearing a grooved shaft or like member and wherein the piece includes an internal ring for mating with such grooved shaft.

16 Claims, 6 Drawing Figures

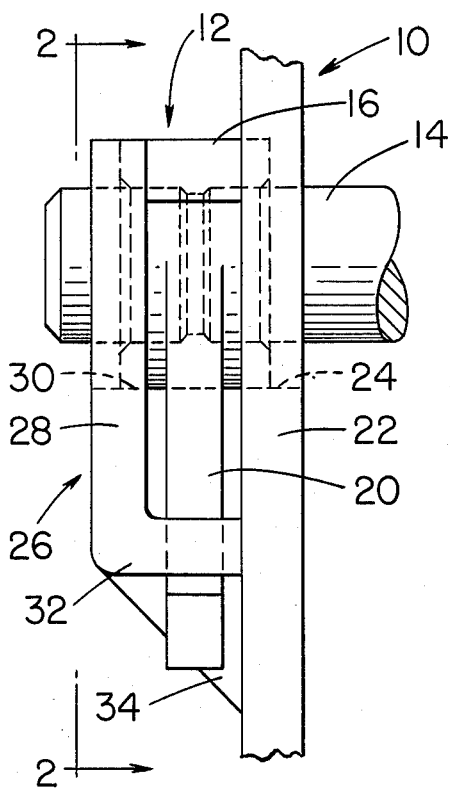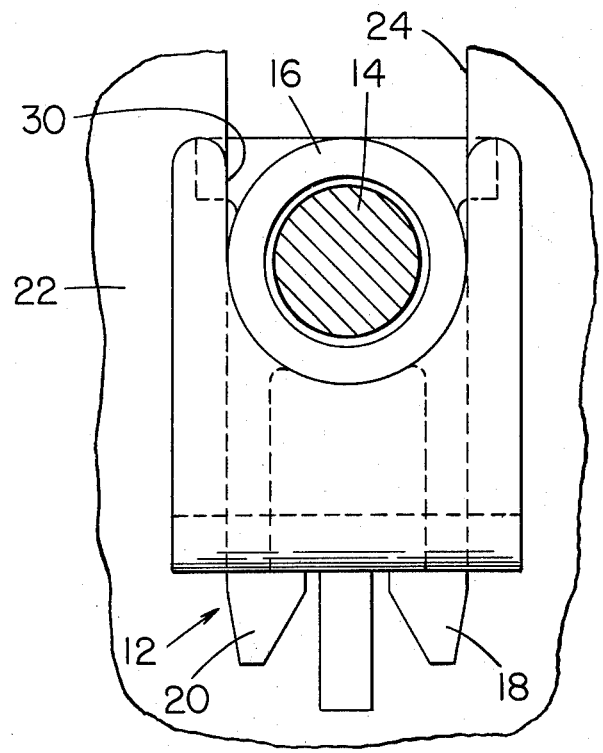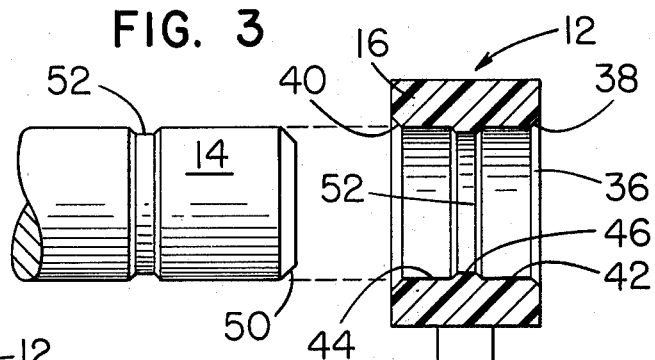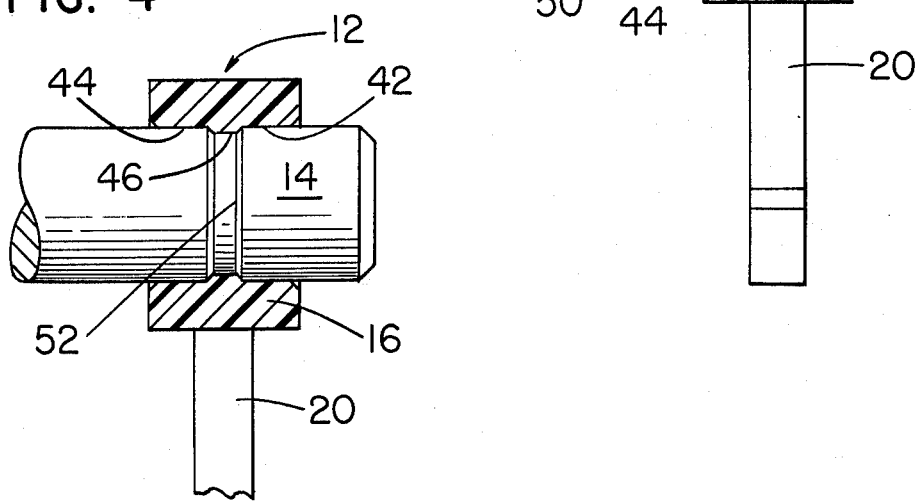

SINGLE PIECE BEARING

BACKGROUND OF THE INVENTION

This invention relates to a single piece bearing which is anchored in or supported from a frame member for the purpose of locating, retaining and bearing a shaft or like member.

With the advent of lighter weight and more compact machines, it is essential that the components of such machines be designed to enable ease of assembly and disassembly while maintaining cost advantages in the market place. As is well known, there are many machines which utilize lighter weight materials of the plastic family in the making of the various parts, especially in those areas where the parts do not require precise dimensions or rigid tolerances. This is also true in the matter of providing bearings for driving members such as shafts which in the past have required precise bearing fits and minimal tolerances to obtain longer life from the various operating elements.

Representative of bearings, bushings and materials therefor in the prior art include Muller U.S. Pat. No. 3,304,136 which discloses an elastic bearing structure having a rubber bushing and a flange with an axially projecting lip, together with a relatively frictionless synthetic material sliding surface. Jorn U.S. Pat. No. 3,353,879 shows a sleeve bearing having an inner sleeve of deformable material with a corrugated cylindrical surface and an outer sleeve of compressible material to fit with the inner sleeve. Fisher U.S. Pat. No. 3,372,960 discloses a self-locking bushing of one piece plastic construction for mounting a rotatable and longitudinally movable shaft, the bushing including a head portion, spaced thinned sections for ease of insertion, abutment elements for retention of the bushing in a panel or support member, and an inner sleeve member for the shaft. Orndorff U.S. Pat. No. 3,497,278 discloses a bearing assembly of resilient construction wherein the bearing surface has strips of elastomeric material between projections and secured by locking bars.

SUMMARY OF THE INVENTION

The present invention relates to bearings and more particularly to a single plastic piece for providing the several functions of locating, retaining, and bearing a shaft or like member. The single piece includes an outside surface and a pair of inside diametral surfaces, the inside surfaces being separated by an internal ring smaller in diameter than the inside surfaces, the ring being substantially centrally located between the inside surfaces for mating with a groove or like recess on the circumference of the shaft.

The wall section of the plastic piece is of a dimension which will enable slight expansion of the inside diameter when the shaft is pressed into the piece. Each of the engageable portions of the shaft and of the plastic bearing have inclined surfaces so as to enable mating of the parts without interference. The internal ring serves to locate and retain the shaft in a longitudinal direction while at least one and preferably the pair of inside surfaces provides a bearing area for the shaft.

In view of the above discussion, the principal object of the present invention is to provide a single piece for locating, retaining, and bearing a shaft or like member.

Another object of the present invention is to provide a single piece bearing for mounting a shaft in a frame member.

An additional object of the present invention is to provide a single piece having a ring portion for retaining a shaft and having at least one and preferably spaced surfaces for bearing the shaft.

A further object of the present invention is to provide a single plastic piece having a ring portion cooperating with a groove in a shaft for retention of the shaft and having a surface on either side of the boss portion, at least one of which provides bearing for the shaft.

Additional advantages and features of the present invention will become apparent and fully understood from a reading of the following description taken together with the annexed drawing, in which:

FIG. 1 is a side view of a bearing supported from a frame and incorporating the subject matter of the present invention;

FIG. 2 is a view taken on the plane 2—2 of FIG. 1;

FIG. 3 is a side view of a bearing, partly in section, for receiving a shaft;

FIG. 4 is a side view of the shaft located and retained in the single piece bearing;

Figure 5:
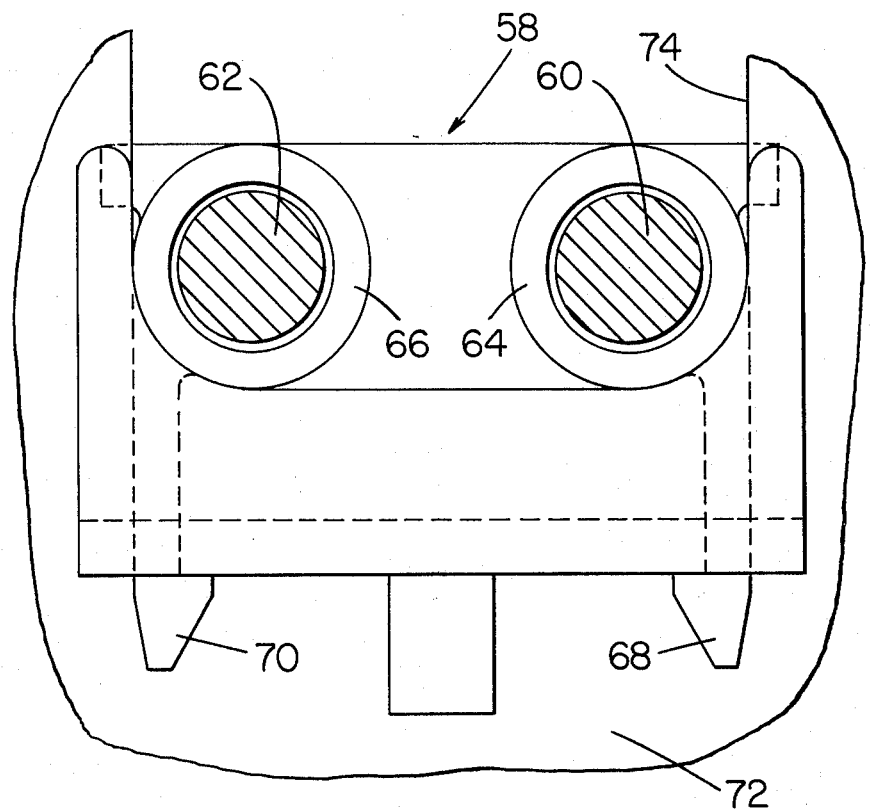
FIG. 5 is a view of a modification of the single plastic piece in a dual configuration thereof.

Referring now to the drawings, FIGS. 1 and 2 show an assembly 10 which includes a single plastic piece 12 for locating, for retaining and for bearing a shaft 14. The single piece 12 includes a body portion 16 having legs 18 and 20 integral therewith and extending downwardly, the piece 12 being supported from a frame member 22 having a formed opening 24 for receiving and for seating one end of the body portion 16 therein. The frame member 22 has a support portion 26 as an integral part thereof for supporting the body portion 16, such support portion 26 having an upstanding arm 28 with a formed opening 30 for receiving and for seating the other end of the portion 16. Support portion 26 includes a short horizontal portion 32 and a brace portion 34 as integral connecting parts of the arm 28 with the frame member 22. The legs 18 and 20 of piece 12, although usually installed downwardly, act to locate and retain the piece 12 in a proper attitude by locking or latching with the framework support portion 26. Of course, the snap-shaped construction will also allow a different orientation of the legs 18 and 20 from that shown, as the legs include the capturing end portions for latching with such framework.

More specifically, the single piece 12, as seen in FIG. 3, includes the body portion 16 of a specified wall thickness and defining a bore 36 with chamfers 38 and 40 at each opening of the bore 36. The interior surface of the wall of body portion 16 includes surfaces 42 and 44 separated by a ring or lip portion 46 of lesser diameter than that of the surfaces 42 and 44, the lip portion 46 also including chamfers at each side thereof for enabling movement of the shaft therepast, as seen in the assembly of FIG. 4. The shaft 14 has a chamfer 50 at the end thereof and a recess or groove 52 for mating with the lip portion 46, the recess 52 - lip portion 46 combination effecting the locating and retaining of the shaft 14 in relation to the piece 12 and the supporting frame, and the surfaces 42 and 44 providing bearing for the shaft 14. The recess 52 is likewise chamfered to avoid damage to the ring 46 and for easy assembly of the parts. In certain applications, it may be permissible or desirable to provide a single bearing surface only for the shaft 14. In such cases, it is of course obvious that same can be done simply by making one or the other of the surfaces 42 and 44 of a diameter somewhat greater than the diameter of shaft 14.

In the manner shown and described, a method is provided for retaining and for bearing the shaft 14 at the same time with a single plastic piece 12 that locates the shaft 14 in its proper position relative to supporting framework. The specially grooved shaft 14 is pressed into the internally ringed bearing 12 until the ring 46 seats into the groove 52 on the shaft, after which the shaft is permitted freedom in rotation. The plastic bearing 12 is designed with the ring or lip portion 46 having just sufficient interference with the diameter of the shaft 14 to require a slight expansion of the portion 46 and enable the shaft to pass thereby. The wall section of the bearing is also designed to require a slight expansion upon pressing of the shaft through the bearing. The extent or width of the ring or lip portion 46 and of the groove or recess 52 are closely controlled to have minimum clearance therebetween so that lateral end play is maintained at a minimum, but insuring that the shaft 14 is capable of rotating freely. The true bearing area is located on each side of the ring or lip portion 46 at the surfaces 42 and 44 and the portion 46 serves only to locate and to retain the shaft 14. Although not specifically shown, there would be required a slight separation or tolerance between the outside diameter of the shaft 14 and the bearing surfaces 42 and 44 to allow free rotation of the shaft.

A safety factor may be included in the ring and groove relationship whereby the groove 52 in the shaft 14 may be slightly deeper than required to enable dirt or other impurities to collect at the bottom of the groove and thereby not interfere with rotation of the shaft. Another safety factor would include the provision of small slots running the length of the bearing to enable dirt or small plastic chips to collect or to pass therealong and not interfere with rotation of the shaft 14.

In FIG. 5 is shown a modification of a single plastic piece 58 for locating, retaining and bearing a pair of shafts 60 and 62 in spaced relationship, the design and construction thereof being similar to that shown in FIG. 2. The single piece 58 includes body portions 64 and 66 with legs 68 and 70 integral therewith and extending downwardly to locate and retain the piece 58 along with the shafts 60 and 62 in relation to a frame member 72 having a formed opening 74 for receiving and for seating the body portions 64 and 66 of piece 58 therein. A support portion may also include a short horizontal strut and a brace portion similar as shown in FIG. 1.

Figure 6:
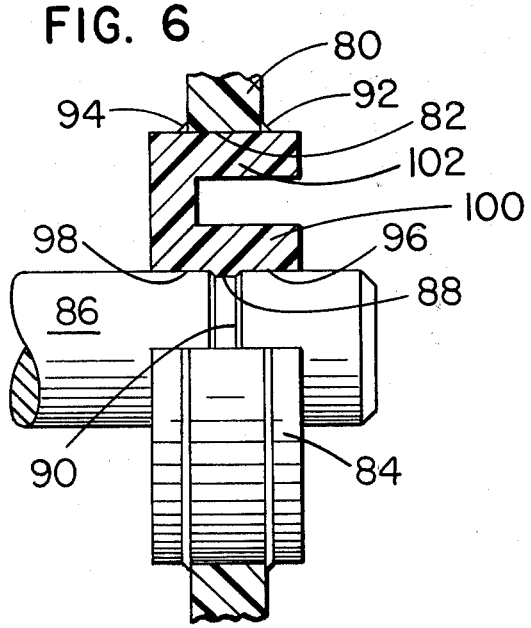
FIG. 6 is a view of a variation of a bearing, partly in section, mounted in a frame member.

A further modification of the invention may be as shown in FIG. 6, wherein a frame plate 80 has an aperture 82 therein, such aperture being of a size to receive a plastic body portion 84 for locating, retaining and bearing a shaft 86. The body portion 84 includes a ring or lip portion 88 for receiving and seating in a recess or groove 90 in the shaft 86. The body portion 84 may include burrs or locking portions 92 and 94 thereon for holding the body portion 84 in place with respect to the plate 80, the burrs being of a size, shape, and resiliency to permit the insertion of one of same through the aperture 82 of plate 80. The body portion 84 includes the bearing surfaces 96 and 98 on either side of the lip portion 88 for bearing the shaft 86. It is also noted that a body portion 84 - aperture 82 tolerance would be required to permit a slight expansion of the body portion 84 upon assembly of the shaft 86 thereinto and to prevent rotation of the body portion 84 upon rotation of the shaft 86. Again, there would be required a tolerance in the fit between the outside diameter of shaft 86 and the bearing surfaces 96 and 98 to allow free rotation of the shaft.

It is of course also within the scope of the invention to provide a recess or groove in the bearing element herein disclosed and a ring or lip on the circumference of the shaft, wherein the shaft is located and retained in the bearing element by cooperation between the recess and the ring and wherein the bearing surface is provided adjacent the groove in the element. While the shaft-recess and the element-ring embodiment is preferred, the first and second diameter portions provide means for retaining and for bearing the shaft in the element. Furthermore, it is well within the scope of the invention to provide the ring or lip either in a full circular or partial (i.e. segmented) manner. Likewise, as mentioned earlier, while the single plastic piece is herein illustrated and described as having shaft bearing surfaces on either side of the internal ring portion, it is of course obvious that such a surface on one side only of the internal ring portion, with sufficient shaft clearance on the other side of such ring portion, would accommodate and be quite satisfactory in many shaft and bearing applications.

Further, the modification in FIG. 6 allows for such slight expansion in the body portion 84 to permit assembly of the shaft 86 therewith. In this respect, the body portion includes a U-shaped configuration wherein an inner portion of leg 100 is yieldable outwardly to permit insertion of the shaft 86 past the ring portion 88. An outer portion or leg 102 of the U-shaped construction is likewise yieldable inwardly to permit insertion of the burr or locking portion 92 past the frame plate 80.

It is thus seen that herein shown and described is a single plastic piece which is useful for locating, retaining and bearing a shaft in a simple and low cost manner. The single piece enables the accomplishment of the objects and advantages mentioned above and while several embodiments of the invention have been disclosed herein, variations as mentioned above and even additional ones thereof may occur to those skilled in the art. It is contemplated that all such variations, not departing from the spirit and scope of the invention hereof, are to be construed in accordance with the following claims.

What is claimed is:

1. A single piece element for supporting a shaft, said shaft having first and second external diameter portions, and said element having an external diameter portion and first and second internal diameter portions defining a wall of uniform thickness between said external diameter portion of said element and said first internal diameter portion of said element, said external diameter portions of said shaft cooperating with said internal diameter portions of said element in mating relationship for retaining said shaft in said element and for providing a bearing surface for said shaft.

2. The element of claim 1 wherein said second external diameter portion of said shaft is a recess and said second internal diameter portion of said element is a ring for cooperating with said recess for retaining said shaft in said element, and said first internal diameter portion of said element provides a bearing surface for said first external diameter portion of said shaft.

3. Means for retaining and for bearing a shaft in a frame member having support means thereon, comprising a single piece body member having an outside diameter surface and an inside diameter surface defining a wall of uniform thickness therebetween and including means connected with said support means for latching said body member in relation to said frame member, said shaft defining at least one recess therein and said body member having at least one internal ring portion of lesser diameter than that of said inside diameter surface for cooperating with said recess, and said inside diameter surface providing a bearing surface for said shaft.

4. The subject matter of claim 3 wherein said one internal ring portion divides said inside diameter surface into spaced surfaces for bearing said shaft.

5. The subject matter of claim 3 wherein said one internal ring portion is centrally located and provides equal bearing surfaces for said shaft.

6. The subject matter of claim 3 wherein said one internal ring portion and said one recess define inclined surfaces for ease of assembly and for mating relationship.

7. A single-piece element for supporting a shaft from a frame having support means connected thereto, said shaft defining at least one recess around the circumference thereof, and said element including a body portion having an outside surface and an inside surface spaced therefrom and defining a wall of uniform thickness therebetween, said body portion including means connected with said support means for preventing rotation of said body portion and at least one ring portion of lesser diameter than said inside surface and cooperating with said recess for retaining said shaft, and said inside surface providing a bearing surface for said shaft.

8. The element of claim 7 wherein said one ring portion divides said inside surface into spaced surfaces for bearing said shaft.

9. The element of claim 7 wherein said one ring portion is centrally located and provides equal bearing surfaces for said shaft.

10. The element of claim 7 wherein said one ring portion and said one recess define inclined surfaces for ease of assembly and for mating relationship therebetween.

11. The element of claim 7 including means integral therewith for latching said element to said support means.

12. The element of claim 9 wherein said equal bearing surfaces extend axially from said ring portion in greater extent that that of said ring portion.

13. The element of claim 11 wherein said latching means include a pair of legs formed in capturing manner and engageable with said support means for preventing rotation of said body portion.

14. A method of retaining and bearing a shaft having a recess therearound, including the steps of providing an annular body member having a uniform wall thickness defined by an exterior surface and an interior surface, said interior surface having an interior ring portion of lesser diameter than the diameter of said interior surface, providing means for locking said body member for preventing rotation thereof, and sliding the shaft through said body member sufficiently to seat said interior ring portion in said recess for locating said shaft, said interior surface providing a bearing surface for said shaft.

15. The method of claim 14 including the further step of providing chamfered portions on said shaft and on said interior ring portion for sliding said shaft therepast.

16. The method of claim 14 wherein said interior surface ring portion is centrally located thereby providing a pair of equal bearing surfaces for said shaft.

* * * * *